United States Patent
Cheng

(10) Patent No.: US 10,282,015 B2
(45) Date of Patent: May 7, 2019

(54) TOUCH SCREEN, DISPLAY PANEL, DISPLAY DEVICE AND METHOD FOR STORING ELECTRIC POWER

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Xiaoliang Cheng, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 101 days.

(21) Appl. No.: 15/272,641

(22) Filed: Sep. 22, 2016

(65) Prior Publication Data
US 2017/0242526 A1 Aug. 24, 2017

(30) Foreign Application Priority Data
Feb. 19, 2016 (CN) .......................... 2016 1 0094491

(51) Int. Cl.
G06F 3/041 (2006.01)
G06F 3/044 (2006.01)

(52) U.S. Cl.
CPC ............ G06F 3/0416 (2013.01); G06F 3/044 (2013.01); G06F 3/0414 (2013.01); *G06F 2203/04105* (2013.01); *G06F 2203/04111* (2013.01)

(58) Field of Classification Search
CPC ............... H01L 41/0825; H01L 41/113; H01L 41/1132; H01L 41/042; H01L 41/25; H02N 2/18; H02N 2/181
See application file for complete search history.

(56) References Cited

U.S. PATENT DOCUMENTS

| 5,332,950 A | * | 7/1994 | Komoda | ............... H05B 33/08 |
| | | | | 315/205 |
| 2009/0243433 A1 | * | 10/2009 | Dirr | ......................... H02J 7/32 |
| | | | | 310/319 |

(Continued)

FOREIGN PATENT DOCUMENTS

| CN | 102221897 A | 10/2011 |
| CN | 102402336 A | 4/2012 |

(Continued)

OTHER PUBLICATIONS

The First Chinese Office Action dated Jan. 30, 2018; Appln. No. 201610094491.X.

(Continued)

*Primary Examiner* — Nitin Patel
*Assistant Examiner* — Amen W Bogale
(74) *Attorney, Agent, or Firm* — Ladas & Parry LLP

(57) ABSTRACT

A touch screen comprising a piezoelectric induction layer and an electric power collecting unit, wherein: the piezoelectric induction layer is configured to induct an external force to generate electric signals, and transmit the electric signals to the electric power collecting unit; and the electric power collecting unit is configured to process the electric signals and store electric power under driving of the electric signals. Thereby the problem of insufficient electric power of electronic device usually happened in being used is solved. A display screen, a display device and a method for storing electric power by using the display screen are further provided.

18 Claims, 5 Drawing Sheets

(56) References Cited

U.S. PATENT DOCUMENTS

| | | | |
|---|---|---|---|
| 2013/0120284 A1 | 5/2013 | Chen et al. | |
| 2013/0257759 A1* | 10/2013 | Daghigh | G06F 3/0412 345/173 |
| 2014/0293155 A1 | 10/2014 | Kim et al. | |
| 2014/0300251 A1* | 10/2014 | Colli | H01L 41/25 310/339 |
| 2015/0287904 A1* | 10/2015 | White | H01L 41/113 310/319 |
| 2015/0331517 A1* | 11/2015 | Filiz | G06F 3/0414 345/173 |

FOREIGN PATENT DOCUMENTS

| | | |
|---|---|---|
| CN | 104281328 A | 1/2015 |
| CN | 104704644 A | 6/2015 |
| KR | 1020140012410 A | 2/2014 |

OTHER PUBLICATIONS

The Second Chinese Office Action dated Sep. 29, 2018; Appln. No. 201610094491.X.

\* cited by examiner

TOUCH SCREEN, DISPLAY PANEL, DISPLAY DEVICE AND METHOD FOR STORING ELECTRIC POWER

TECHNICAL FIELD

The embodiments of the present disclosure relate to a touch screen, a display panel, a display device and a method for storing electric power.

BACKGROUND TECHNOLOGY

Currently, touch screens employing touch control technology are applied in portable electronic apparatus such as smart phone, tablet computer, and so on. As function of the portable apparatus is more and more strong, it is used more and more often. However, because battery of the portable electronic apparatus has relative small capacity, there would often be a problem of insufficient electric power.

In summary, since the battery of the portable electronic apparatus has relative small capacity, the problem of insufficient electric power is often occurred.

DISCLOSURE OF THE INVENTION

According to at least an embodiment of the present disclosure, a touch screen comprising a piezoelectric induction layer and an electric power collecting unit is provided, wherein: the piezoelectric induction layer is configured to induct an external force to generate electric signals, and transmit the electric signals to the electric power collecting unit; and the electric power collecting unit is configured to process the electric signals and store electric power under driving of the electric signals.

According to at least an embodiment of the present disclosure, a method for storing electric power by using a display screen is provided, comprising: acquiring electric signals generated by a external force with a piezoelectric induction layer; and processing the electric signals and storing electric power under driving of the electric signals, with an electric power collecting unit.

DESCRIPTION OF THE ATTACHED DRAWINGS

In order to more clearly describe the technical solution of the embodiments of the present invention, the attached drawings for the embodiments will be briefly described, it is obvious that the attached drawings in the following description only illustrate some embodiments of the present invention, but not are intended to limit the present invention.

DETAILED DESCRIPTION OF THE EMBODIMENTS

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

An touch screen according to embodiments of the present disclosure includes a piezoelectric induction layer and an electric power collecting unit, the piezoelectric induction layer is configured to induct an external force to generate electric signals, and transmit the electric signals to the electric power collecting unit; the electric power collecting unit is configured to process the electric signals and store electric power under driving of the electric signals. In the embodiments of the present disclosure, the piezoelectric induction layer converts a pressure signal into the electric signals after inducting an external pressure, the electric power collecting unit collects the electric signals, and stores electric power under driving of the electric signals, thus, when a portable electronic apparatus has insufficient electric power, the stored electric power can be used to charge a battery.

Hereinafter, embodiments of the present disclosure will be described in further detail in connection with the attached drawings.

Figure 1:
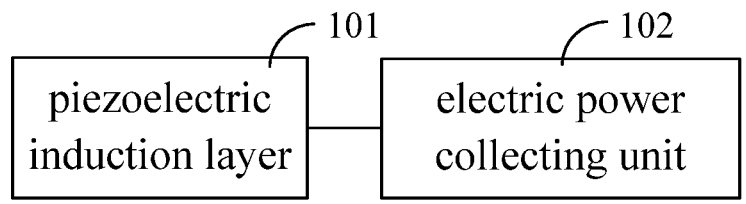
FIG. 1 is a first schematic diagram illustrating structure of a touch screen according to embodiments of the present disclosure.

As shown in FIG. 1, in the embodiment of the present disclosure, a touch screen includes:

a piezoelectric induction layer 101 configured to induct an external force to generate electric signals, and transmit the above electric signals to the above electric power collecting unit; and the electric power collecting unit 102 configured to process the electric signals and store electric power under driving of the above electric signal.

In the embodiment of the present disclosure, when the piezoelectric induction layer 101 is subjected from an external force along a certain direction so as to be deformed (including bending deformation and stretching deformation), a polarization phenomenon is occurred therein, at the same time, electric signals having opposite polarities appear respectively on the two opposite surfaces of the piezoelectric induction layer 101. After the external force is removed, the piezoelectric induction layer 101 will return to the electrically neutral state. When the external force direction is changed, the polarities of the electric signals are changed accordingly. The above electric power collection unit 102 collects the above signals, and stores the electric power under driving of the electric signals, thus, when the portable electronic apparatus has insufficient electric power, the stored electric power can be used to charge the battery.

Figure 2:
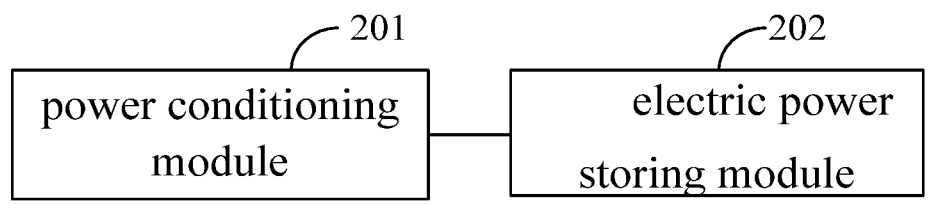
FIG. 2 is a schematic diagram illustrating structure of an electric power collecting unit according to embodiments of the present disclosure.

For example, as shown in FIG. 2, the electric power collecting unit 102 includes:

a power conditioning module 201 configured to convert the electric signals into direct current (DC) electric signals and amplify the DC electric signals; and an electric power storing module 202 configured to store the electric power processed by the power conditioning module.

In the embodiments of the present disclosure, the power conditioning module 201 converts the AC electric signals generated by the piezoelectric induction layer into the DC electric signals capable of being received by the electric power storing module, and amplifies the converted DC electric signals, thus facilitates to store the electric power and store more electric power. The electric power 202 can store the electric power processed by the power conditioning module 201, and can use the stored electric power to charge the battery when the portable electronic apparatus has insufficient electric power. According to an example of the present disclosure, the power conditioning module 201 can be implemented by a general purpose processor or a dedicated processor chip. The electric power storing module 202 can be implemented by a battery, a capacitor, or the like.

For example, the piezoelectric induction layer 101 includes a matrix formed by a plurality of independent piezoelectric induction modules, the piezoelectric induction modules are electrically insulated from each other, and an upper electrode layer and a lower electrode layer are respectively provided on an upper face and a lower face of each of the piezoelectric induction modules.

Figure 3:
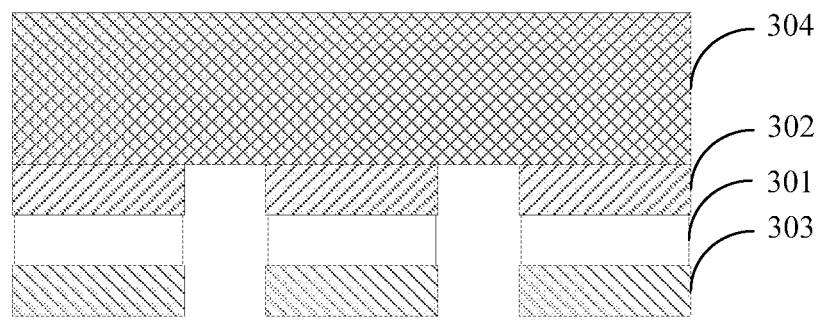
FIG. 3 is a second schematic diagram illustrating structure of a touch screen according to embodiments of the present disclosure.

In embodiments of the present disclosure, as shown by the schematic structure diagram of the touch screen in FIG. 3, the piezoelectric induction layer includes a plurality of independent piezoelectric induction modules, for example, one of the piezoelectric induction modules 301 is provided with an upper electrode layer 302 and a lower electrode layer 303 at an upper face and a lower face thereof, and the upper electrode layer 302 and the lower electrode layer 303 are configured to collect the electric signals of said one piezoelectric induction module incurred by action of the external force.

For example, a protection layer 304 can be provided at outside of each of the upper electrode layers 302, the protection layer 304 is formed by using glass or by using organic transparent material, for better supporting and protecting the upper electrode layer 302, the piezoelectric induction module 301 and the lower electrode layer 303.

In the embodiment of the present disclosure, the transparent material with piezoelectricity for forming the piezoelectric induction layer 101 includes polylactic piezoelectric film or piezoelectric ceramics film. The upper electrode layer 302 includes at least one of indium gallium zinc oxide, indium zinc oxide, indium tin oxide or indium gallium tin oxide. The lower electrode layer 303 includes at least one of indium gallium zinc oxide, indium zinc oxide, indium tin oxide or indium gallium tin oxide.

For example, each of the piezoelectric modules 301 has a cross section in any one shape selected from circular, square, or rhombus. The upper electrode layer 302 and the lower electrode layer 303 may have cross sections in any one shape selected from circular, square or rhombus.

In the embodiment of the present disclosure, orthographic projection of the piezoelectric induction module 301 on the upper electrode layer 302 is located in a profile of the upper electrode layer 302, for example, fully located in the profile of the upper electrode layer, and orthographic projection of the piezoelectric induction module 301 on the lower electrode layer 303 is located in a profile of the lower electrode layer 303, for example, fully located in the profile of the lower electrode layer 303.

It is to be noted that each of the piezoelectric induction modules 301, the corresponding upper electrode layer 302 and the corresponding lower electrode layer 303 may have the same cross section shape, and can also be differently provided, for example, are different from each other, as long as the orthographic projections of the piezoelectric induction module 301 on the upper electrode layer 302 and the lower electrode layer 303 are respectively located in the profiles of the upper electrode layer 302 and the lower electrode layer 303, so as to guarantee that the electric signals induced by each of the piezoelectric induction module can be collected by the upper electrode layer 302 and the lower electrode layer 303. For example, the orthographic projections of the piezoelectric induction module 301 on the upper electrode layer 302 and the lower electrode layer 303 are fully located in the profiles of the upper electrode layer 302 and the lower electrode layer 303, so as to guarantee that the electric signals induced by each of the piezoelectric induction modules can be collected by the upper electrode layer 302 and the lower electrode layer 303.

For example, a touch screen according to embodiments of the present disclosure further includes a row detection processor and a column detection processor configured to detect a touch position.

For example, the upper electrode layers of each row of the piezoelectric induction modules are connected with the above row detection processor, and the lower electrode layers of each column of the piezoelectric induction modules are connected with the above column detection processor. Alternatively, the lower electrode layers of each row of the piezoelectric induction modules are connected with the above row detection processor, and the upper electrode layers of each column of the piezoelectric induction modules are connected with the above column detection processor.

In the embodiment of the present disclosure, the piezoelectric induction modules are connected with the processors for detecting the touch position through transmission lines, and the transmission lines includes at least one of indium gallium zinc oxide, indium zinc oxide, indium tin oxide or indium gallium tin oxide. For example, connection structure between the piezoelectric induction modules and the processors for detecting the touch position will be described by referring to an example that the upper electrode layers of each row of the piezoelectric induction modules are connected with the row detection processor and the upper electrode layers of each column of the piezoelectric induction modules are connected with the column detection processor. The processors can be implemented by using general purpose processors, e.g. a CPU or application-specific processor chips.

Figure 4:
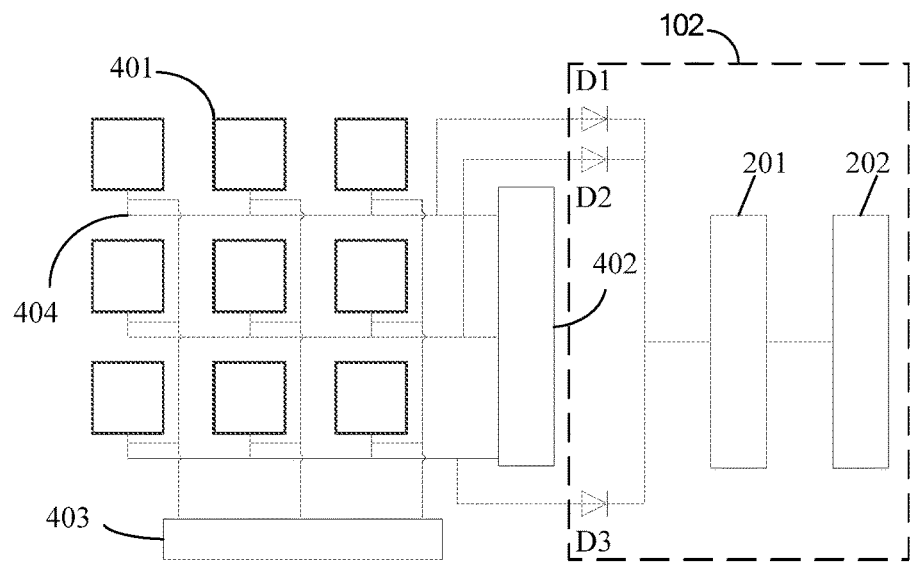
FIG. 4 is a first diagram illustrating arrangement of a piezoelectric induction module, a detection processor and an electric power collecting unit according to embodiments of the present disclosure.

The connection structure between the piezoelectric induction modules and the processors for detecting the touch position is shown in FIG. 4, wherein the upper electrode layers of the same row of the piezoelectric induction modules 401 are connected together so as to be collectively connected with the row detection processor 402, and the upper electrode layers of the same column of the piezoelectric induction modules are connected together to be collectively connected with the column detection processor 403. When a touch action is occurred on the touch screen, the piezoelectric induction module 401 corresponding to the touch position inducts the external force to generate electric signals, the electric signals generated by the piezoelectric induction module 401 is transmitted to the row detection processor 402 and the column detection processor 403 by the transmission lines 404, so that a horizontal coordinate of the touch position can be determined by the row detection processor 402 and the vertical coordinate of the touch position can be determined by the column detection processor 403, thus, the touch position can be located by the coordinates.

It is to be noted that in the embodiment of the present disclosure, the connection manner between the piezoelectric induction modules and the processors for detecting the touch position can also be such that the piezoelectric induction modules in the same row are respectively connected with the row detection processor and the piezoelectric induction modules in the same column are respectively connected with the column detection processor, there is no limitation on the specific connection manner, however, by connecting the upper electrode layers or the lower electrode layers are together to be collectively connected with the detection processor, by doing so, the structure is simple, and wiring can be simplified.

For example, the connection manners between the piezoelectric induction module array and the electric power collecting unit include but are not limited to the following two manners:

First manner: the upper electrode layers of each row of the piezoelectric induction modules are connected together, or the lower electrode layers of each row of the piezoelectric induction modules are connected together, and then are connected with the power conditioning module through a diode. For example, the electric signals generated by each row of the piezoelectric induction modules are transmitted to the power conditioning module in parallel.

In implementation, FIG. 4 shows the structure in which each row of the piezoelectric induction modules are connected together to be connected with the electric power collecting unit. Taking the piezoelectric induction module array being a 3*3 array as an example, the upper electrode layers of each row of the piezoelectric induction modules are connected together, or the lower electrode layers of each row of the piezoelectric induction modules are connected together, after that, the first row of the piezoelectric induction modules are connected with the power conditioning module 201 in the electric power collecting unit through a diode D1, the second row of the piezoelectric induction modules are connected with the power conditioning module 201 in the electric power collecting unit through a diode D2, and the third row of the piezoelectric induction modules are connected with the power conditioning module 201 in the electric power collecting unit through a diode D3, thus, it is implemented that the electric power generated by the three rows of the piezoelectric induction modules are transmitted to the electric power collecting unit in parallel. For example, the diodes D1, D2 and D3 can each be a SCHOTTKY diode, and function to prevent crosstalk of the electric signals from different rows.

Second manner: the upper electrode layers of each column of the piezoelectric induction modules are connected together, or the lower electrode layers of each column of the piezoelectric induction modules are connected together, and are connected with the power conditioning module through a diode. For example, the electric signals generated by each column of the piezoelectric induction modules are transmitted to the power conditioning module in parallel.

Figure 5:
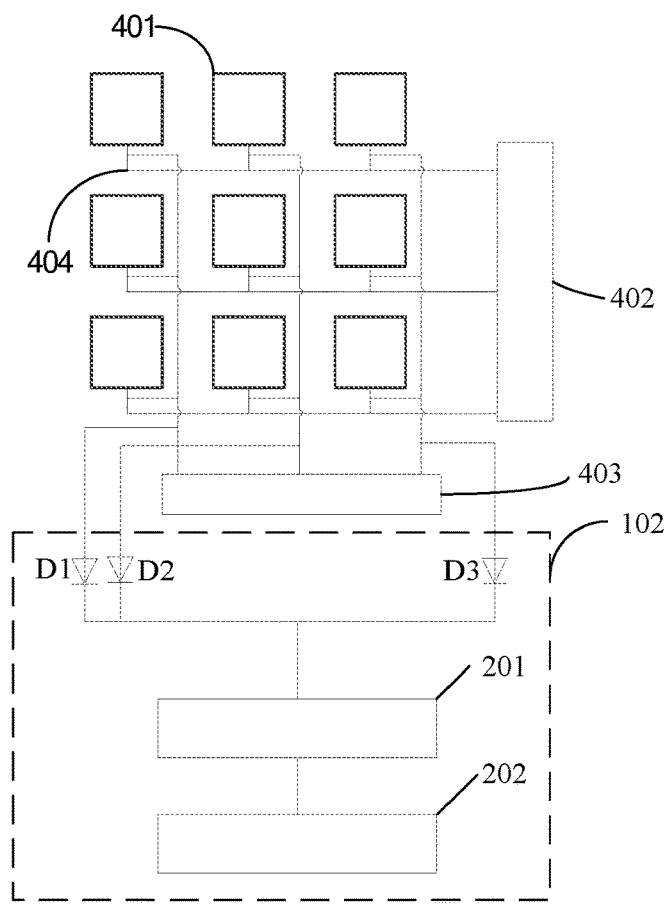
FIG. 5 is a second diagram showing the arrangement of a piezoelectric induction module, a detection processor and an electric power collecting unit according to embodiments of the present disclosure.

For example, FIG. 5 shows a structure in which each column of the piezoelectric induction modules 401 are connected together so as to be connected with the electric power collecting unit 102. Taking the piezoelectric induction module array being a 3*3 array as an example, after the upper electrode layers of each column of the piezoelectric induction modules 401 are connected together, or the lower electrode layers of each column of the piezoelectric induction modules 401 are connected together, the first column of the piezoelectric induction modules are connected with the power conditioning module 201 in the electric power collecting unit through a diode D1, the second column of the piezoelectric induction modules are connected with the power conditioning module 201 in the electric power collecting unit through a diode D2, and the third column of the piezoelectric induction modules are connected with the power conditioning module 201 in the electric power collecting unit through a diode D3, Thus it is implemented that the electric power generated by the three columns of the piezoelectric induction modules are collectively transmitted to the electric power collecting unit in parallel. For example, the diodes D1, D2 and D3 can each be a SCHOTTKY diode, and function to prevent crosstalk of the electric signals from different columns.

For example, the power conditioning module 201 is a voltage triple rectifier circuit, and the electric power storing module 202 is a circuit in which a storage component is connected with a Zener diode in parallel.

Figure 6:
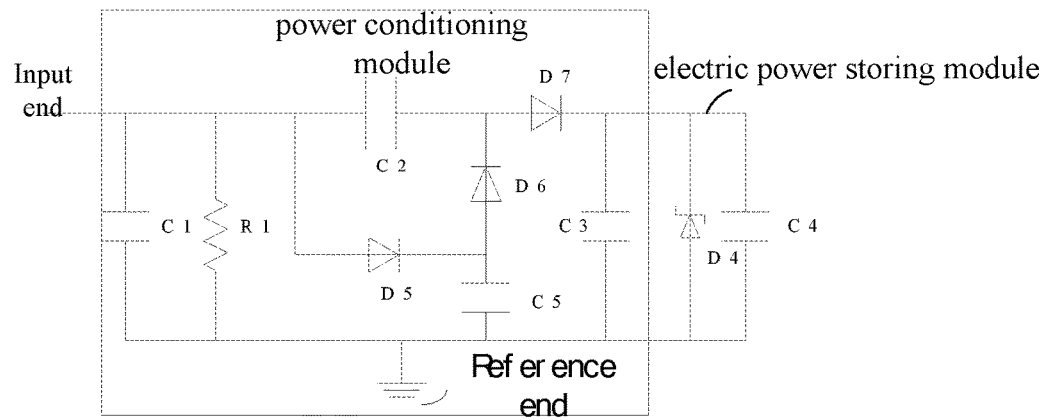
FIG. 6 is a circuit diagram illustrating an electric power collecting unit according to embodiments of the present disclosure.

For example, FIG. 6 shows the voltage triple rectifier circuit and the circuit in which the storage component is connected with the Zener diode in parallel, the voltage triple rectifier circuit includes capacitors C1, C2, and C3, a resistor R1, and diodes D5, D6, and D7. According to an example of the present invention, the capacitor C1 is connected with the resistor R1 in parallel, and are connected with an input end and a reference end of the circuit. One end of the capacitor C2 and an anode of the diode D5 are both connected with the input end of the circuit, an anode of the diode D6 is connected with a cathode of the diode D5, a cathode of the diode D6 is connected with the other end of the capacitor C2, and the diodes D5, D6 and the capacitor C2 construct a loop. An anode of the diode D7 is connected with another end of the capacitor C2 (the cathode of the diode D6), a cathode of the diode D7 is connected with one end of the capacitor C3 in series, and another end of the capacitor C3 is connected with the reference end of the circuit, at the cathode of the diode D5, the anode of the diode D6 is connected with an end of the capacitor C5, and another end of the capacitor C5 is connected with the reference end of the circuit. The AC electric signals generated by the piezoelectric induction layer are converted into DC electric signals by the voltage triple rectifier circuit, and voltage of the DC electric signals are amplified to be triple of the original voltage. The electric power storing module 202 includes a storage component C4 and a Zener diode D4, and the storage component C4 is connected with the Zener diode D4 in parallel. For example, the storage component C4 may be a super capacitor or a battery, and functions to store electric power. The Zener diode functions to protect the storage component, and has a parameter corresponding to the maximum permissible voltage of the super capacitor or the battery.

It is to be noted that the circuit of the electric power storing module in which the storage component is connected with the Zener diode in parallel is only an example for exemplarily illustrating the electric power storing module according to the embodiment of the present disclosure, and any circuit capable of storing electric power can be applied in the embodiment of the present disclosure.

For example, when the electric power in the electric power collecting module 202 has been accumulated up to a preset value, it can be used to charge the battery.

In the embodiment of the present disclosure, the electric power is stored in the storage component C4, and when the electric power stored in the storage component C4 has been accumulated up to a preset value, the stored power is discharged to the battery, so that charge the battery, thus, the usage time of the portable electronic apparatus can be extended.

In the embodiment of the present disclosure, almost all the electric power generated by the piezoelectric induction layer can be transmitted to the electric power collecting unit, and the power required by the detection processors can also be supplied by the electric power generated by the piezoelectric induction layer, but, since the power consumed by the detection processors is very small, and can be neglected.

For example, the touch screen according to the embodiment of the present disclosure further includes a plurality of field effect transistors.

According to an example of the present invention, connection manners between the field effect transistors and the piezoelectric induction layer and the electric power collecting unit include but are not limited to the following four manners:

First manner: the upper electrode layers of each row of the piezoelectric induction modules are connected together, and are connected with a drain of a corresponding one of the field effect transistors, a source of said one field effect transistor is connected with the power conditioning module through the diode, a gate of said one field effect transistor is connected with a corresponding detection processor, and the gate and the drain of said one field effect transistor are connected.

Second manner: the lower electrode layers of each row of the piezoelectric induction modules are connected together, and are connected with a drain of a corresponding one of the field effect transistors, a source of said one field effect transistor is connected with the power conditioning module through the diode, a gate of said one field effect transistor is connected with a corresponding detection processor, and the gate and the drain of said one field effect transistor are connected.

In the first manner according to the embodiment of the present disclosure, the drain of the field effect transistor is connected with the upper electrode layers of each row of the piezoelectric induction modules, and in the second manner, is connected with the lower electrode layers of each row of the piezoelectric induction modules, when being connected in the first manner and in the second manner, the gate of the field effect transistor is connected with the corresponding row detection processor.

Figure 7:
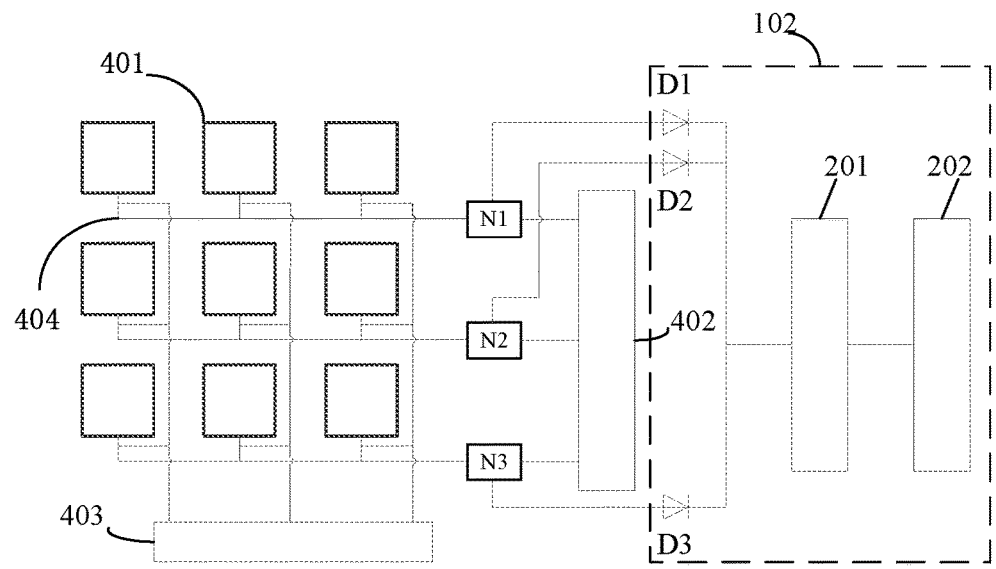
FIG. 7 is a first schematic diagram illustrating connection of a piezoelectric induction module, a detection processor and an electric power collecting unit according to embodiments of the present disclosure.
Figure 9:
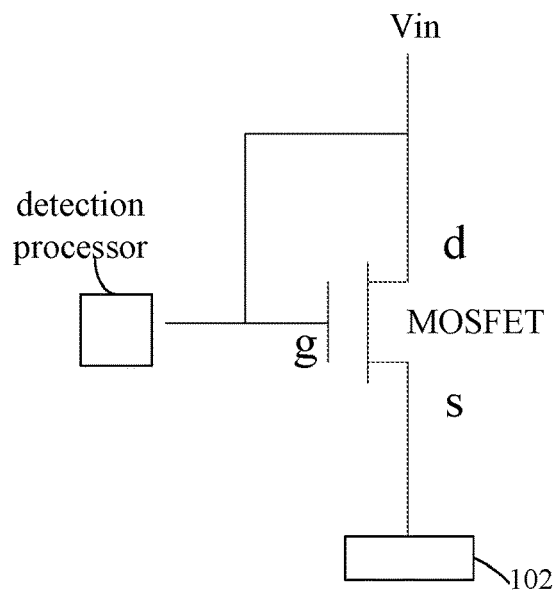
FIG. 9 is a schematic diagram illustrating structure of a field effect transistor according to embodiments of the present disclosure.

FIG. 7 shows the connection manner in the first manner and the second manner, in which each row of the piezoelectric induction modules are connected together, and a MOSEFT (field effect transistor) is interposed between each row of the connected piezoelectric induction modules 401 and the electric power collecting unit 102. As N1, N2 and N3 shown in FIG. 7, the MOSEFTs, such as N1, N2, N3 etc. are all connected with relevant portions in the connection manner as shown in FIG. 9, for example, the gate and the drain of the corresponding MOSFET are connected, before a voltage required by detecting the touch position has not been achieved at one of the processors for detecting a corresponding row, the source and the drain of the MOSFET would not be conducted, thus, the electric power generated by the touch can be used for detecting the touch position firstly, and only the remaining portion is collected and stored, thus, it is ensured to detect the touch position in sensitive and reliable manner.

Third manner: the upper electrode layers of each column of the piezoelectric induction modules 401 are connected together, and are connected with a drain of a corresponding one of the field effect transistors, a source of said one field effect transistor is connected with the power conditioning module through the diode, a gate of said one field effect transistor is connected with a corresponding detection processor, and the gate and the drain of said one field effect transistor are connected.

Fourth manner: the lower electrode layers of each column of the piezoelectric induction modules are connected together, and are connected with a drain of a corresponding one of the field effect transistors, a source of said one field effect transistor is connected with the power conditioning module through the diode, a gate of said one field effect transistor is connected with a corresponding detection processor, and the gate and the drain of said one field effect transistor are connected.

In the third manner according to the embodiment of the present disclosure, the drain of the field effect transistor is connected with the upper electrode layers of each column of the piezoelectric induction modules, and in the fourth manner, is connected with the lower electrode layers of each column of the piezoelectric induction modules 401, when being connected in the third manner and in the fourth manner, the gate of the field effect transistor is connected with the corresponding column detection processor.

Figure 8:
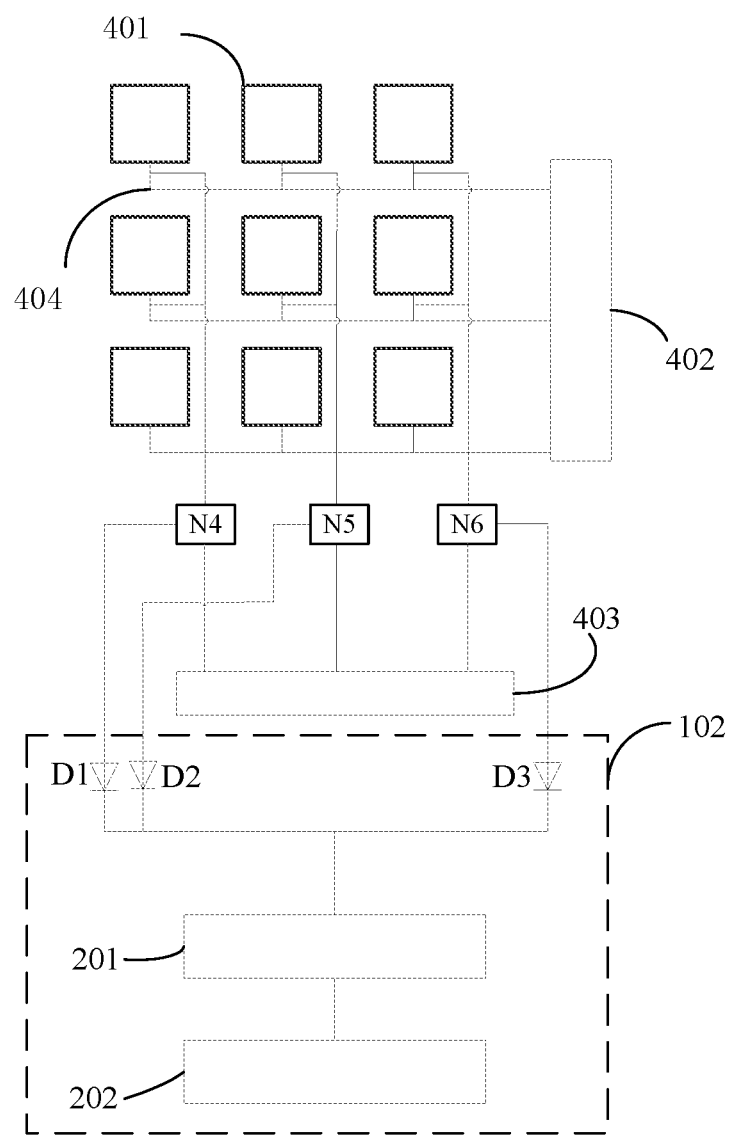
FIG. 8 is a second schematic diagram illustrating connection of a piezoelectric induction module, a detection processor and an electric power collecting unit according to embodiments of the present disclosure.

FIG. 8 shows the third connection manner and the fourth connection manner, in which each column of the piezoelectric induction modules are connected together, and a MOSEFT (field effect transistor) is interposed between each row of the connected piezoelectric induction modules and the electric power collecting unit 102. As N4, N5 and N6 shown in FIG. 8, the MOSEFTs, such as N4, N5, N6 etc. are connected with relevant portions in the connection manner as shown in FIG. 9, for example, the gate and the drain of the corresponding MOSFET are connected, before a voltage required by detecting the touch position has not been achieved at one of the processors for detecting a corresponding column, the source and the drain of the MOSFET would not be conducted, thus, the electric power generated by the touch can be used for detecting the touch position firstly, and only the remaining portion is collected and stored, thus, it is ensured to detect the touch position in sensitive and reliable manner.

The detection processors in the embodiment of the present disclosure each includes a operational amplifier, the electric power output from the gates g of the MOSEFTs is passed through the operational amplifiers in the detection processors firstly, and then the electric power output from the operational amplifiers is used by the detection processors for detecting the touch position.

Figure 10:
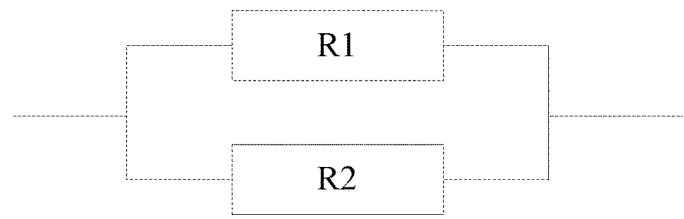
FIG. 10 is a schematic diagram illustrating electric power distribution according to embodiments of the present disclosure.

According to an example of the present invention, the on-state resistance of the MOSEFT can be infinite small with respect to the resistance of the operational amplifier in the detection processor, assuming the on-state resistance of the MOSFET by itself is R1 (a on-state voltage drop of 0.3V will be generated), and the resistance of the operational amplifier is R2 (approaches infinite large), it is equivalent that a resistor R1 is connected with a resistor R2 in parallel. As shown in FIGS. 10, R1 and R2 are connected in parallel, and the total resistance after parallel connection is less than the resistance of R1, and is also less than the resistance of R2, current passing through the resistor R2 of the operational amplifier is indefinite small with respect to current passing through R1, therefore, loss on the resistor R2 of the operational amplifier can be neglected, that is to say, the electric power output to the detection processors from the gates of the MOSFETs can be neglected.

According to an example of the present invention, in the conventional touch screen, no electric power collecting unit is provided, and current required by the operation of the operational amplifier is provided by a chip for detecting the touch position, while in the embodiment of the present disclosure, by adding the electric power collecting unit, the electric power generated by the piezoelectric induction layer can be utilized.

Embodiments of the present disclosure further provides a display panel including the touch screen as described in the above described embodiment, and thus will not be described in detail herein.

Embodiments of the present disclosure further provides a display device including the display panel as described in the above embodiment, and thus will not be further described herein.

Figure 11:
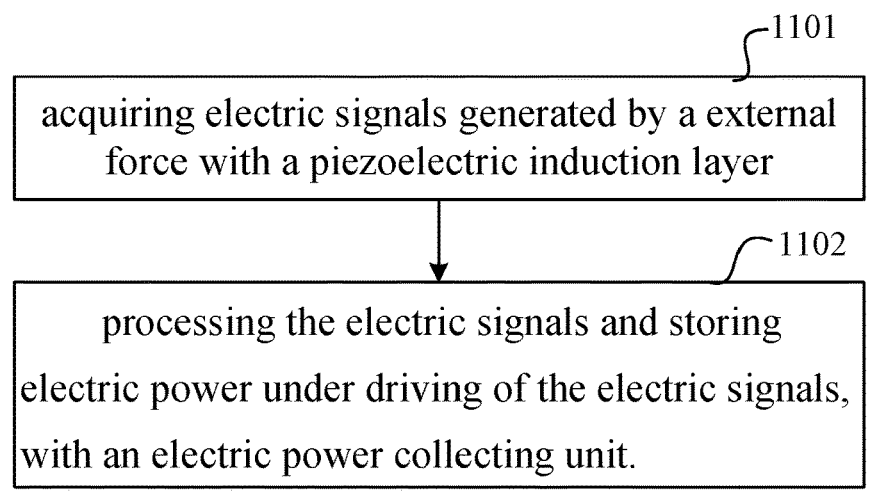
FIG. 11 is a flowchart diagram illustrating a method for storing electric power according to embodiments of the present disclosure.

As shown in FIG. 11, embodiments of the present disclosure provides a method for storing electric power by using a touch screen, the method includes:

in step 1101, acquiring electric signals generated by an external force by a piezoelectric induction layer;

In step 1102, processing the above electric signals by an electric power collecting unit, and storing the electric power under driving of the electric signals.

For example, the electric power collecting unit processes the above electric signals, converts the above electric signals into DC electric signals, and amplifies the above DC electric signals, so as to store the electric power under the driving of the amplified DC electric signals.

Furthermore, when the stored electric power has been accumulated up to a preset value, a battery is charged.

The method for storing the electric power according to the embodiment of the present disclosure can be as follows: a force is acted on a protection layer 304 firstly, the protection layer 304 is deformed with a amplitude depending on the magnitude of the force, the deformation of the protection layer will force the piezoelectric induction modules at the corresponding positions to be deformed and thus to generate the electric signals, the generated electric signals can be collected through the upper electrode layers 302 or the lower electrode layers 303, and are transmitted to the power conditioning module 201 through transmission lines, to convert the above electric signals into the DC electric signals and amplify the same. Then, the electric power is stored in the electric power storing module, and when the stored electric power has been accumulated up to the preset value, it can be used to charge the battery.

Those skilled in the art can make various modifications and variations to the present disclosure without departing from the spirit and scope thereof. Thus, if these modifications and variations of the present disclosure are within the scope of the claims of the invention as well as their equivalents, the present disclosure is also intended to include these modifications and variations.

The present application claims the priority of Chinese Patent Application No. 201610094491.X filed on Feb. 19, 2016, the Chinese Patent Application is entirely incorporated therein as a part of the present application by reference.

What is claimed is:

1. A touch screen comprising a piezoelectric induction layer and an electric power collecting unit, wherein:
the piezoelectric induction layer is configured to induct an external force to generate electric signals, and transmit the electric signals to the electric power collecting unit; and
the electric power collecting unit is configured to process the electric signals and store electric power under driving of the electric signals;
wherein the piezoelectric induction layer comprises a matrix of a plurality of independent piezoelectric induction modules;
wherein, each of the piezoelectric induction modules is provided with an upper electrode layer and a lower electrode layer at its upper and lower faces, respectively;
wherein an orthographic projection of each of the piezoelectric induction modules on each of the upper electrode layers is located in a profile of the upper electrode layer, and an orthographic projection of each of the piezoelectric induction modules on each of the lower electrode layers is located in a profile of the lower electrode layer;
wherein: the electric power collecting unit comprises:
a power conditioning module configured to convert the electric signals into DC electric signals and amplify the DC electric signals;
wherein the touch screen further comprises a plurality of field effect transistors;
the upper electrode layers of each row of the piezoelectric induction modules are connected together and are connected with a drain of one of the field effect transistors, a source of the one of the field effect transistors is connected with the power conditioning module through a diode, a gate of the one of the field effect transistors is connected with a corresponding external force detection processor, and the gate and the drain of the one of the field effect transistors are connected; or
the lower electrode layers of each row of the piezoelectric induction modules are connected together and are connected with a drain of one of the field effect transistors, a source of the one of the field effect transistors is connected with the power conditioning module through a diode, a gate of the one of the field effect transistors is connected with a corresponding external force detection processor, and the gate and the drain of the one of the field effect transistors are connected; or
the upper electrode layers of each column of the piezoelectric induction modules are connected together and are connected with a drain of one of the field effect transistors, a source of the one of the field effect transistors is connected with the power conditioning module through a diode, a gate of the one of the field effect transistors is connected with a corresponding external force detection processor, and the gate and the drain of the one of the field effect transistors are connected; or
the lower electrode layers of each column of the piezoelectric induction modules are connected together and are connected with a drain of one of the field effect transistors, a source of the one of the field effect transistors is connected with the power conditioning module through a diode, a gate of the one of the field effect transistors is connected with a corresponding external force detection processor, and the gate and the drain of the one of the field effect transistors are connected.

2. A touch screen comprising a piezoelectric induction layer and an electric power collecting unit, wherein:
   the piezoelectric induction layer is configured to induct an external force to generate electric signals, and transmit the electric signals to the electric power collecting unit; and
   the electric power collecting unit is configured to process the electric signals and store electric power under driving of the electric signals;
   wherein the piezoelectric induction layer comprises a matrix of a plurality of independent piezoelectric induction modules;
   wherein, each of the piezoelectric induction modules is provided with an upper electrode layer and a lower electrode layer at its upper and lower faces, respectively;
   wherein: the electric power collecting unit comprises:
   a power conditioning module configured to convert the electric signals into DC electric signals and amplify the DC electric signals;
   wherein the touch screen further comprises a plurality of field effect transistors;
   the upper electrode layers of each row of the piezoelectric induction modules are connected together and are connected with a drain of one of the field effect transistors, a source of the one of the field effect transistors is connected with the power conditioning module through a diode, a gate of the one of the field effect transistors is connected with a corresponding external force detection processor, and the gate and the drain of the one of the field effect transistors are connected; or
   the lower electrode layers of each row of the piezoelectric induction modules are connected together and are connected with a drain of one of the field effect transistors, a source of the one of the field effect transistors is connected with the power conditioning module through a diode, a gate of the one of the field effect transistors is connected with a corresponding external force detection processor, and the gate and the drain of the one of the field effect transistors are connected; or
   the upper electrode layers of each column of the piezoelectric induction modules are connected together and are connected with a drain of one of the field effect transistors, a source of the one of the field effect transistors is connected with the power conditioning module through a diode, a gate of the one of the field effect transistors is connected with a corresponding external force detection processor, and the gate and the drain of the one of the field effect transistors are connected; or
   the lower electrode layers of each column of the piezoelectric induction modules are connected together and are connected with a drain of one of the field effect transistors, a source of the one of the field effect transistors is connected with the power conditioning module through a diode, a gate of the one of the field effect transistors is connected with a corresponding external force detection processor, and the gate and the drain of the one of the field effect transistors are connected.

3. The touch screen according to claim 2, wherein the electric power collecting unit comprises:
   the power conditioning module configured to convert the electric signals into the DC electric signals, and amplify the DC electric signals; and
   a electric power storing module configured to process the electric signals which has been processed by the power conditioning module to store the electric power.

4. The touch screen according to claim 3, wherein the electric power storing module is configured to charge a battery when the stored electric power has been accumulated up to a preset value.

5. The touch screen according to claim 3, wherein the power conditioning module is a voltage triple rectifier circuit.

6. The touch screen according to claim 2, wherein, the piezoelectric induction modules are electrically insulated from each other.

7. The touch screen according to claim 2, wherein the touch screen further comprises a row detection processor and a column detection processor configured to detect a touch position.

8. The touch screen according to claim 7, wherein the upper electrode layers of each row of the piezoelectric induction modules are connected with the row detection processor, and the upper electrode layers of each column of the piezoelectric induction modules are connected with the column detection processor; and
   the lower electrode layers of each row of the piezoelectric induction modules are connected with the row detection processor, and the lower electrode layers of each column of the piezoelectric induction modules are connected with the column detection processor.

9. The touch screen according to claim 2, wherein,
   the upper electrode layers of each row of the piezoelectric induction modules are connected together, or the lower electrode layers of each row of the piezoelectric induction modules are connected together, and are connected with the power conditioning module through the diode; or
   the upper electrode layers of each column of the piezoelectric induction modules are connected together, or the lower electrode layers of each column of the piezoelectric induction modules are connected together, and are connected with the power conditioning module through the diode.

10. The touch screen according to claim 2, wherein if the drain of the one of the field effect transistors is connected with the upper electrode layers of each row of the piezoelectric induction modules, or is connected with the lower electrode layers of each row of the piezoelectric induction modules, the gate of the one of the field effect transistors is connected with a row detection processor; and if the drain of the one of the field effect transistors is connected with the upper electrode layers of each column of the piezoelectric induction modules, or is connected with the lower electrode layers of each column of the piezoelectric induction modules, the gate of the one of the field effect transistors is connected with a column detection processor.

11. The touch screen according to claim 2, wherein the piezoelectric induction modules each has a cross section in any one shape selected from circular, square or rhombus, and the upper electrode layers and the lower electrode layers each has a cross section in any one shape selected from circular, square or rhombus.

12. The touch screen according to claim 2, wherein the piezoelectric induction layer comprises transparent material having piezoelectricity;
the transparent material having piezoelectricity comprises polylactic piezoelectric film or piezoelectric ceramics film;
the upper electrode layers each comprises at least one of indium gallium zinc oxide, indium zinc oxide, indium tin oxide or indium gallium tin oxide; and
the lower electrode layers each comprises at least one of indium gallium zinc oxide, indium zinc oxide, indium tin oxide or indium gallium tin oxide.

13. The touch screen according to claim 2, wherein a protection layer is further provided at outside of the upper electrode layers, and material for the protection layer comprises glass or organic transparent material.

14. A display panel, comprising the touch screen according to claim 2.

15. A display device, comprising the touch screen according to claim 2.

16. A method for storing the electric power by using the touch screen according to claim 2, comprising:
acquiring the electric signals generated by the external force with the piezoelectric induction layer; and
processing the electric signals and storing the electric power under the driving of the electric signals, with the electric power collecting unit;
wherein the piezoelectric induction layer comprises the matrix of the plurality of independent piezoelectric induction modules;
wherein the upper electrode layer and the lower electrode layer at the upper and lower faces of the each of the piezoelectric induction modules respectively;
wherein: the electric power collecting unit comprises:
the power conditioning module configured to convert the electric signals into the DC electric signals and amplify the DC electric signals;
wherein the touch screen further comprises the plurality of field effect transistors;
the upper electrode layers of the each row of the piezoelectric induction modules are connected together and are connected with the drain of the one of the field effect transistors, the source of the one of the field effect transistors is connected with the power conditioning module through the diode, the gate of the one of the field effect transistors is connected with the corresponding external force detection processor, and the gate and the drain of the one of the field effect transistors are connected; or
the lower electrode layers of the each row of the piezoelectric induction modules are connected together and are connected with the drain of the one of the field effect transistors, the source of the one of the field effect transistors is connected with the power conditioning module through the diode, the gate of the one of the field effect transistors is connected with the corresponding external force detection processor, and the gate and the drain of the one of the field effect transistors are connected; or
the upper electrode layers of the each column of the piezoelectric induction modules are connected together and are connected with the drain of the one of the field effect transistors, the source of the one of the field effect transistors is connected with the power conditioning module through the diode, the gate of the one of the field effect transistors is connected with the corresponding external force detection processor, and the gate and the drain of the one of the field effect transistors are connected; or
the lower electrode layers of the each column of the piezoelectric induction modules are connected together and are connected with the drain of the one of the field effect transistors, the source of the one of the field effect transistors is connected with the power conditioning module through the diode, the gate of the one of the field effect transistors is connected with the corresponding external force detection processor, and the gate and the drain of the one of the field effect transistors are connected.

17. The method according to claim 16, wherein said processing the electric signals and storing the electric power under the driving of the electric signals with the electric power collecting unit comprises:
with the electric power collecting unit, converting the electric signals into the DC electric signals and amplifying the DC electric signals so as to store the electric power under driving of the amplified DC electric signals.

18. The method according to claim 16, wherein said processing the
electric signals and the storing electric power under the driving of the electric signals with the electric power collecting unit further comprises:
charging a battery after the stored electric power has accumulated up to a preset value, with the electric power collecting unit.

* * * * *